United States Patent [19]
Kirsch et al.

[11] 3,999,797
[45] Dec. 28, 1976

[54] AIRVANE DEVICE FOR BLUFF VEHICLES AND THE LIKE

[75] Inventors: Jeffrey W. Kirsch, La Jolla; Sabodh K. Garg, San Diego, both of Calif.

[73] Assignee: Systems, Science and Software, La Jolla, Calif.

[22] Filed: Nov. 26, 1975

[21] Appl. No.: 635,273

Related U.S. Application Data
[63] Continuation of Ser. No. 456,470, April 1, 1974, abandoned.

[52] U.S. Cl. .................. 296/1 S; 105/2 R; 244/130
[51] Int. Cl.² ........................................ B62D 35/00
[58] Field of Search .......... 296/1 S, 91; 105/2 R, 105/2 A; 244/130

[56] References Cited
UNITED STATES PATENTS

| | | |
|---|---|---|
| 1,837,901 | 12/1931 | Fottinger ................... 244/130 |
| 2,243,906 | 6/1941 | Huet ......................... 105/2 R |
| 2,569,983 | 10/1951 | Favre ....................... 244/130 |
| 2,863,695 | 12/1958 | Stamm ..................... 296/1 S |
| 3,097,882 | 7/1963 | Andrews ................... 296/91 |

FOREIGN PATENTS OR APPLICATIONS 1,336,673   7/1963   France ......................... 296/1 S

*Primary Examiner*—Robert R. Song
*Attorney, Agent, or Firm*—Fitch, Even, Tabin & Luedeka

[57] ABSTRACT

An airvane for use with bluff vehicles and the like to reduce air drag thereon is disclosed wherein the airvane includes a curved portion and a generally planar portion. Such airvanes are mounted adjacent the corner edges of the vehicle, particularly the windward corner edges, and reduce separation of air along the rearwardly extending surfaces of the vehicle in a manner to reduce air drag and buffeting of the vehicle.

9 Claims, 7 Drawing Figures

U.S. Patent  Dec. 28, 1976  Sheet 1 of 2  3,999,797
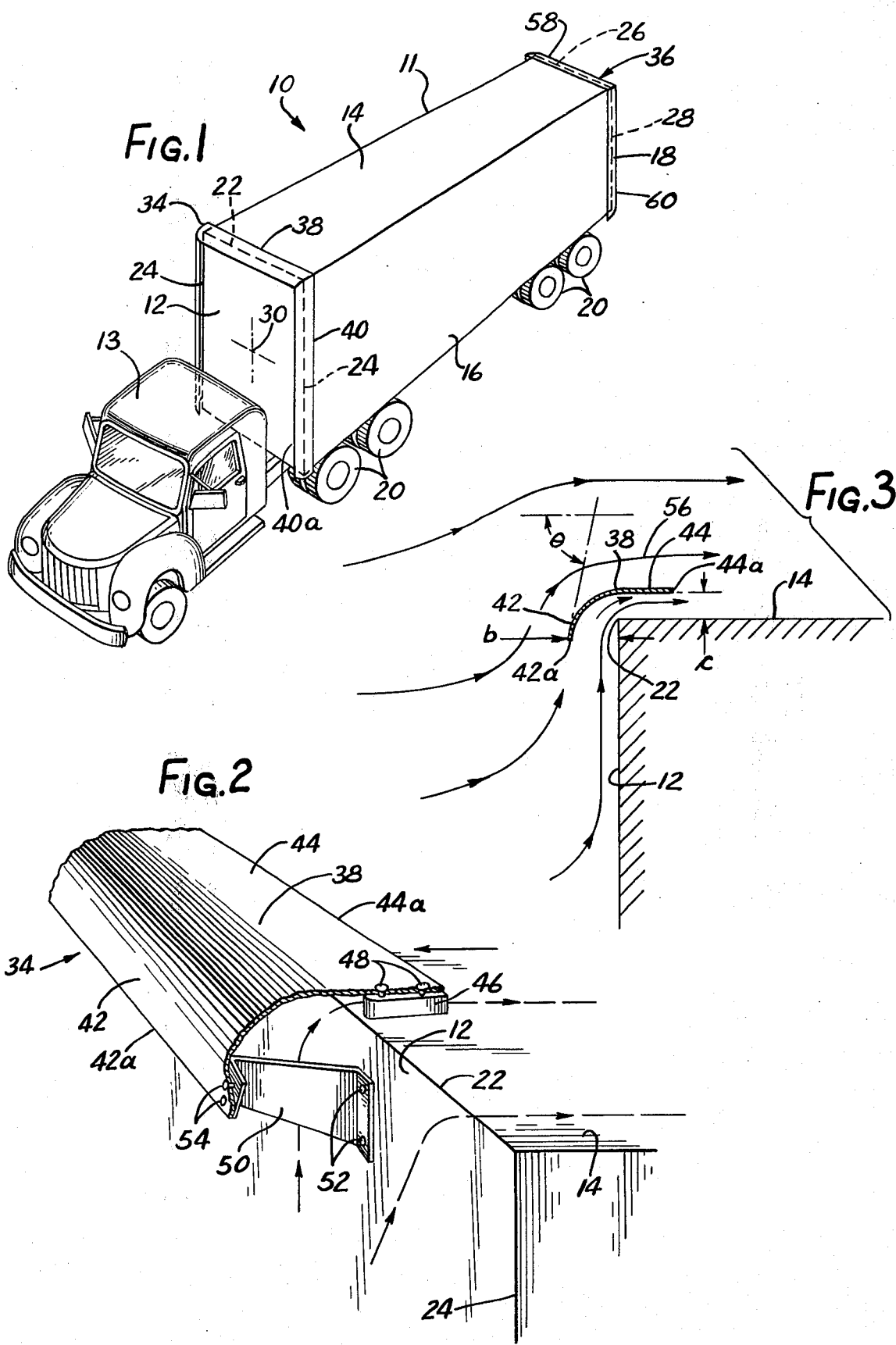

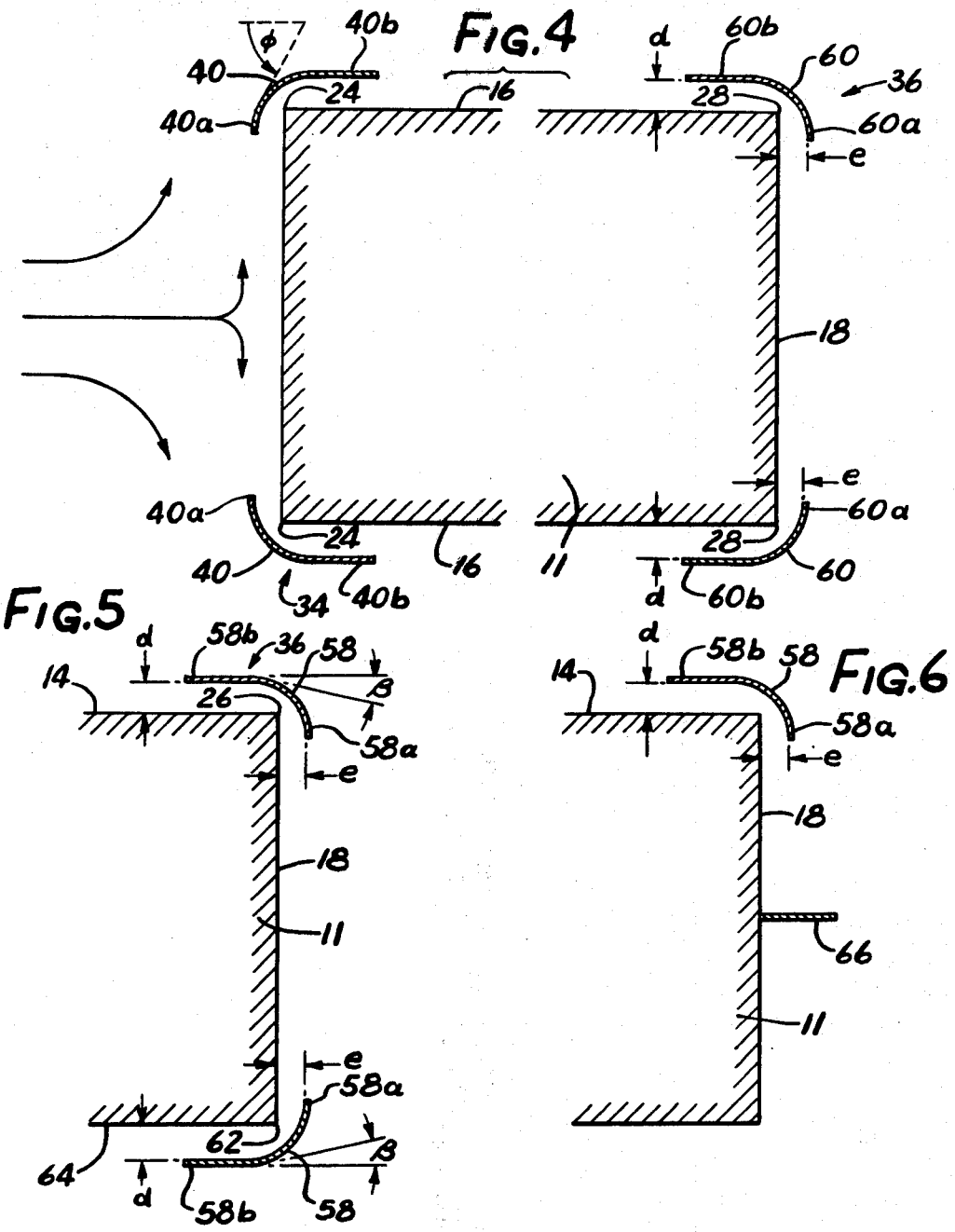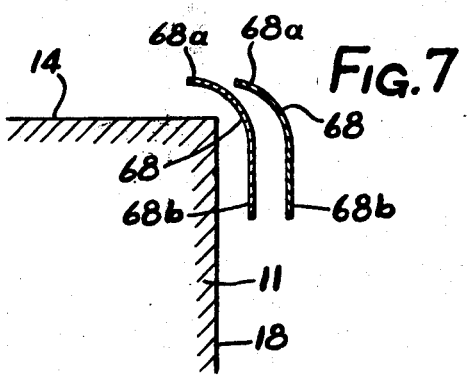

AIRVANE DEVICE FOR BLUFF VEHICLES AND THE LIKE

The present application is a continuation of application, Ser. No. 456,470, filed Apr. 1, 1974, now abandoned, and relates generally to devices for reducing air drag on bluff vehicles and the like, and more particularly to a novel airvane device for mounting adjacent one or more corner edges of a bluff vehicle to effect selected air flow around the bluff vehicle in a manner to reduce air drag thereon.

Commerical vehicles, such as trucks and buses, have long played an important role in the transportation of goods and personnel between different locations. With the advent of super highways, these vehicles have maintained their importance in the transportation field and have been developed to travel at high rates of speed, often substantially exceeding 50 mph. To retain maximum load capacity, the contemporary truck and bus designs have maintained the traditional box-like or bluff vehicle design, with relatively few changes in vehicle design being incorporated to streamline the vehicles and provide improved aerodynamic characteristics.

The traditional truck and bus designs may be generally termed "bluff" vehicles in that they have relatively broad flattened front surfaces. It is known that air drag on such bluff vehicles increases as the square of the relative air speed. For large bluff vehicles such as trucks and buses, the air drag can exceed the rolling friction losses at speeds in excess of 50 mph. The increased drag requires larger power plants which result in greater fuel consumption. The wide variety of body shapes and configurations of bluff vehicles have presented a formidable obstacle to the development of aerodynamic design criteria for reducing air drag on bluff vehicles.

Attempts have been made to streamline the designs of trailer trucks and buses and, while such designs have provided increased efficiency through reduction of air drag, they have correspondingly reduced the payloads that may be carried by the vehicles. As a consequence, the traditional box-like bluff design has maintained its influence in present day truck and bus designs.

One approach to reducing air drag on bluff vehicles, to which the present invention is directed, is the utilization of airvanes to guide or direct air flow around the corner edges of the bluff vehicles so as to eliminate separation of air from the lateral side surfaces of the vehicles, to reduce the overall pressure acting on the windward surface of the bluff vehicles, and also to develop aerodynamic forces on the airvane that reduce the air drag on the vehicle. While attempts have been made to employ airvanes on bluff vehicles to reduce air drag thereon, the prior art airvanes have not proven successful generally because of their failure to sufficiently reduce air drag to make them economically justifiable.

An example of an airstream control device to reduce the air drag on truck vehicles is disclosed in U.S. Pat. No. 2,863,695 to A. F. Stamm. The airstream control kit disclosed in the Stamm patent employs means mounted on the truck cab to deflect air flow so that it impacts on the windward face of the trailer near the outer edges whereafter the impacting air is channeled by fixtures on the trailer to flow around the windward edges of the trailer. In the Stamm device, the flow deflectors on the truck cab are essential to reduce the air drag on the trailer.

In accordance with the present invention, an improved airvane is provided which is simple in construction, highly efficient in reducing air drag on a bluff vehicle, and substantially more economical than the prior art devices.

It is therefore one of the primary objects of the present invention to provide an improved airvane for use on a bluff vehicle to reduce air drag thereon.

Another object of the present invention is to provide an airvane for mounting on one or more corner edge portions of a bluff vehicle in a manner to cause air passing adjacent the bluff vehicle to flow through nozzle-like passages defined between the airvanes and the bluff body. Air passing through the air passages defined by the airvanes mounted on the windward edges of the bluff vehicle is caused to accelerate and flow along the rearwardly extending surfaces of the vehicle without separating therefrom, while the air passing through the air passages defined by the airvanes mounted adjacent the rearward corner edges is caused to decelerate whereby the airvanes reduce air drag on the bluff vehicle, substantially reduce buffeting of the vehicle, and reduce swirling and spray of dirt and air about the bluff vehicle which inhibit visibility of other nearby vehicles.

In accordance with the present invention, an airvane having a curved portion and a straight or planar portion is adapted for mounting on a bluff vehicle adjacent a corner edge thereof. The airvanes mounted adjacent the windward corner edges of the bluff surface are disposed with their curved portions extending forwardly of the plane of the bluff surface and curving about the adjacent corner edge surfaces. The trailing planar portions of the airvanes mounted adjacent the windward edges are disposed in generally parallel spaced relation from the associated rearwardly extending surfaces of the vehicle and cooperate with the forward curved portions of the airvanes to define air passages which cause air passing therethrough to be contracted as it passes over the corner edges of the bluff surface of the vehicle. The airvanes mounted adjacent the rearward corner edges of the bluff vehicle define air passages which cause air passing therethrough to be decelerated. Air drag on a bluff vehicle body may be reduced upwards of 30% by employing airvanes according to the present invention, as compared to the air drag experienced by bluff vehicles without such airvanes.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a perspective view of a bluff vehicle in the form of a truck cab and trailer wherein the trailer has airvanes mounted thereon in accordance with the present invention;

FIG. 2 is an enlarged perspective view illustrating the mounting of an airvane in accordance with one embodiment of the present invention on the bluff vehicle as shown in FIG. 1;

FIG. 3 is a partial side view schematically illustrating the flow of air around the upper horizontal edge of a bluff vehicle surface having an airvane associated therewith in accordance with the present invention;

FIG. 4 is a schematic plan view illustrating air flow around a bluff vehicle having airvanes in accordance with the present invention mounted adjacent the vertical windward and rear corner edges thereof;

FIG. 5 is a schematic side view of the rearward end of a bluff vehicle having airvanes mounted adjacent the upper and lower horizontal edges;

FIG. 6 is a schematic view similar to FIG. 5 but showing a horizontal plate mounted on the rear vertical surface of the bluff body when the lower horizontal airvane is not employed; and FIG. 7 is a partial vertical sectional view schematically showing the use of a pair of airvanes mounted in tandem adjacent the upper rear horizontal edge of a bluff body.

Referring now to the drawings, and in particular to FIG. 1, a bluff vehicle in the form of a trailer truck is indicated generally at 10. The vehicle 10 takes the form of a cab and trailer such as conventionally employed in semi-trailer combinations wherein a trailer 11 is pulled behind a cab 13 which provides the driving power for moving the trailer 11. The trailer 11 represents but one of a number of different type bluff vehicles or bodies with which the present invention may be employed. The trailer 11 has a forward or windward generally planar vertically disposed bluff surface 12, an upper horizontally disposed planar top surface 14, generally vertically disposed lateral side surfaces, one of which is shown at 16, and a vertically disposed trailing or rearward surface 18 which conventionally provides access doors or the like to the interior of the compartment defined within the trailer 11. Forward and rearward sets of wheels 20 are secured to the undercarriage of the trailer 11 in a known manner. The planes of the upper surface 14 and lateral side surfaces 16 of the trailer 11 intercept the planes of the forward and rearward vertically disposed surfaces 12 and 18 at generally right angles so as to define a front horizontal top windward corner edge 22, vertically disposed front or windward side corner edges 24, a rear upper horizontal corner edge 26, and rear vertically disposed corner edges 28.

It is known that when a bluff vehicle such as the illustrated trailer 11 is moved in a forward direction such that air impinges against the forward bluff or windward surface 12 of the vehicle, an air flow stagnation point is formed near the geometric center of the bluff surface 12, as indicated at 30. The air flow adjacent the windward surface 12 moves generally radially outwardly from the stagnation point 30 toward the windward edges 22 and 24. The air pressure exerted against the bluff surface 12 is of greatest magnitude at the stagnation point 30 and diminishes in magnitude as the air pressure is considered at progressively greater distances from the stagnation point. It is this air pressure acting on the bluff surface which resists forward motion of the vehicle. Tests have shown that if the air is allowed to flow freely over the bluff surface 12 during motion of the vehicle 10 so as to freely pass over the edge surfaces 22 and 24, the air flow will separate from the top and lateral side surfaces 14 and 16, respectively, rearwardly of the forward edges 22 and 24 with the result that regions of circulatory, turbulent flow are formed downstream of the edges 22 and 24. Such regions of circulatory turbulent flow extend rearwardly along the top and side surfaces 14 and 16 of the trailer body 11 to points at which the main air flow reattaches to the trailer body, which points of reattachment are substantially downstream from the leading edges 22 and 24. Typically, this reattachment occurs at a distance substantially equivalent to the lateral dimension of the bluff surface 12 exposed to the air flow. The net result of this condition is that more energy is required by a vehicle to move the extra air out of its path than if the air were caused to turn or pass over the edges 22 and 24 smoothly. It has been found that the phenomenon of air drag resulting from separation of the air streams from the top and lateral side surfaces of a bluff vehicle applies to substantially any bluff vehicle. It will therefore be appreciated that the concept of the present invention as described in greater detail hereinbelow applies to other forms of bluff vehicles such as buses, etc.

In accordance with the present invention, airvane means, indicated generally at 34, are mounted on the bluff vehicle 10 adjacent the bluff surface 12 on the trailer 11 to effect smooth aerodynamic flow of air around the forward windward edges 22 and 24 of the bluff surface so as to reduce air drag on the vehicle. In the illustrated embodiment, the bluff vehicle 10 also has airvane means, indicated generally at 36, mounted on the trailer 11 adjacent the rearward surface 18 to further facilitate a reduction in air drag on the bluff vehicle. As will become more apparent hereinbelow, the airvane means 34 provide the primary reduction in air drag on the vehicle 10.

The airvane means 34 includes an upper horizontally disposed airvane member 38 mounted to overlie the horizontal forward edge 22 of the trailer 11, and a pair of laterally spaced generally vertically disposed airvane members 40 mounted on the trailer 11 adjacent the lateral vertical windward corner edges 24 thereof. The airvane members 38 and 40 are substantially identical in configuration, and may be mounted on the bluff vehicle 10 independent of each other. Preferably, however, both the forward horizontal and vertical airvane members 38 and 40, respectively, are employed at the leading end surface 12 of the trailer 11 and are mounted in such a manner that adjacent end portions are connected so as to prevent an air gap between the adjacent ends.

With reference to FIG. 2, one manner of mounting the airvanes 38 and 40 to the trailer 11 of the bluff vehicle 10 is illustrated wherein an upper horizontal airvane member 38 is shown attached to the upper planar surface 14 of the forward planar surface 12 of the trailer. The airvane member 38 includes a forward curved portion or section 42 and a trailing generally planar portion or section 44 formed integral with the forward curved section 42. The airvane 38 may be formed from suitable materials and structures having strength and stiffness characteristics sufficient to maintain its transverse configuration when subjected to dynamic loads from wind pressure during movement of the bluff vehicle 10. For example, the airvane 38 may be made from a suitable metallic or rigid plastic material. The airvane 38 might also be made of a suitable inexpensive disposable material such as pressed paper, fiber or structured foam plastic of sufficient strength to withstand dynamic forces during use, but which can be disposed of after a single use if desired. Such a disposable airvane finds particular application when logistics require one-way transport of bluff containers.

The forward curved portion 42 of the airvane member 38 extends forwardly from the plane of the front windward surface 12 of the trailer 11 such that a leading edge 42a is positioned upstream from the associated corner edge 22 of the trailer 11. The forward curved portion 42 of the airvane member 38 is formed to define a concave surface relative to the corner edge 22 of the trailer 11, which concave surface has a smooth aerodynamic curvature to insure smooth flow of air thereunder during movement of the bluff vehicle 10. The forward curved portion 42 of the airvane member 38 may be formed into a circular arc, considered in transverse section, having an included angular extent of up to 90°. Other aerodynamic curvatures may be employed for the curved portion 42 of the airvane member 38.

The rearward generally planar portion 44 of the airvane 38 extends rearwardly from the plane of the forward surface 12 of the trailer 11 and is mounted in parallel spaced relation above the upper horizontal surface 14 by means of a plurality of spacer members, one of which is shown at 46. The spacers 46 are secured to the upper surface 14 of the trailer 11 in lateral spaced relation slightly rearwardly from the corner edge 22. The planar portion 44 of the airvane member 38 may be secured to the spacer member 46 by any suitable means such as bolts 48 which may extend through the spacer members 46 for attachment to the upper surface 14 of the trailer 11.

A plurality of front support brackets 50 are secured to the vertically disposed forward surface 12 of the trailer 11 through suitable means such as bolts 52. The brackets 50 extend forwardly from the forward surface 12 and provide means to which the forward edge portion of the curved portion 42 of the airvane member 38 may be secured as by bolts 54. The illustrated spacer members 46 and support brackets 50 are but one example of means for mounting the airvane member 38 in the desired position relative to the windward edge 22 of the trailer 11.

FIG. 3 illustrates schematically the desired location of the forward airvane member 38 relative to the forward surface 12 and upper horizontal surface 14 of the trailer body 11 so as to maximize the reduction of air drag on the bluff vehicle 10. With the airvane member 38 being secured to the trailer 11 as illustrated in FIG. 2 such that the curved portion 42 extends forwardly from the plane of the bluff surface 12 and the planar portion 44 extends rearwardly from the plane of the bluff surface 12, the horizontal distance between the leading edge 42a and the plane of the bluff surface 12 is designated by $b$. The vertical distance between the planar portion 44 of the airvane 38 and the upper horizontal surface 14 of the trailer body 11, as measured at the trailing edge 44a of the airvane, is designated by $c$. It has been found that for trailer bodies 11 having vertical heights of between 10–13 feet and lateral widths of approximately 8 feet, the gap $c$ (termed the "wall jet gap") should be between approximately 2 and 3 cm. In general, the radius of curvature of the curved section 42 of the airvane member 38 should be less than approximately 12% of the distance from the upper corner edge 22 of the bluff surface 12 to the stagnation point 30 which, as noted, is near the geometrical center of the bluff surface. The horizontal length of the planar portion 44 of the airvane member 38, considered in the plane of FIG. 3 rearwardly from the plane of the bluff surface 12, must be sufficient to enable smooth mixing of air which passes between the airvane members 38 and the vehicle body with air which passes above the airvane 38, as designated by the arrow 56. Such mixing takes place rearwardly from the trailing edge 44a of the planar portion 44 of the airvane member 38. The horizontal length of the planar portion 44 of the airvane 38, considered in the plane of FIG. 3, should be of a magnitude between approximately ½ and 3/2 times the radius of curvature of the forward curved portion 42 of the airvane.

The ratio of the spatial relationships $b$ to $c$ (i.e. $b/c$) is termed the contraction ratio of the nozzle-like air flow passageway defined between the airvane member 38 and the outer surfaces 12 and 14 of the vehicle body 10. For optimum efficiency, it has been found that the contraction ratio $b/c$ should be between approximately 5–6, or alternatively expressed as $5.5 \pm 0.5$. This ratio applies for a relative air speed of the vehicle 10 of approximately 70 mph. At higher relative air speeds over the trailer 11, for example 120 mph, optimum performance will be obtained when the contraction ratio $b/c$ is between approximately 2 and 4, i.e. approximately 3.5. These limits for the contraction ratio $b/c$ are established to avoid high losses in air flow between the airvane 38 and the bluff corner 22 that are associated with compressibility effects as the local air speed between the airvane member and the bluff corner approaches the transonic region.

In accordance with the present invention, it is found that optimum air drag reduction is accomplished when the airvane member 38 is mounted generally as described herein with respect to FIG. 3, with an additional mounting parameter being that a line drawn tangent to the curvature of the forward curved portion 42 of the airvane at the leading edge 42a forms an included angle of approximately 86 degrees relative to the horizontal, as indicated by the angle represented by the Greek letter theta ($\theta$) in FIG. 3.

As noted, the vertically disposed airvane members 40 are identical in configuration to the airvane members 38. With reference to FIG. 4, the side vertical airvane members 40 are mounted on the trailer body 11 adjacent the forward vertical edges 24 in generally similar fashion to mounting of the upper horizontal airvane member 38 such that the forward curved portions 40a of the airvane members 40 extend forwardly from the plane of the bluff surface 12. Similarly, the straight or planar surface portions 40b of the airvane members 40 extend rearwardly from the plane of the bluff surface 12 of the trailer 11 in outward parallel spaced relation to the lateral side surfaces 14 of the trailer, as shown in FIG. 4. The vertically disposed side airvane members 40 provide optimum drag reduction when the curvature of the forward curved portions 40a thereof terminate at a position wherein a straight line drawn tangent to the forward curved portion of each airvane 40 at the leading edge thereof forms an included angle of approximately 50°, as designated by the Greek letter phi ($\phi$) in FIG. 4. In the case of the side airvane members 40, the contraction ratio $b/c$ was found to provide optimum results when the ratio was between approximately 5 and 6 at speeds up to 70 mph, and between approximately 3 and 4 at 120 mph.

In accordance with the present invention, the employment of the described airvane members 38 and 40 on the trailer body 11 adjacent the windward corner edges 22 and 24 will effect a streamlined flow of air around the corners 22 and 24 of the bluff surface 12 so as to significantly reduce the air drag and also reduce buffeting on the vehicle. This reduction in air drag will result with the corners 22 and 24 being substantially square corners, as illustrated in FIGS. 2 and 3, and also when the corners are provided with small radii or are slightly beveled.

In addition to employing forward airvane means 34 to reduce air drag on a bluff vehicle 10, the present invention also contemplates the employment of the rearward airvane means 36 to further reduce air drag effects on the bluff vehicle. FIGS. 4-7 illustrate schematically various configurations for mounting rear airvane members to further reduce air drag on the bluff vehicle 10. The airvane means 36 are identical to the above-described airvane means 34. That is, the airvane means 36 includes a horizontally disposed airvane member 58 and a pair of vertically and laterally disposed airvane members, one of which is shown at 60 in FIG. 1. The airvane members 58 and 60 are identical in transverse sectional configuration, respectively, to the forward airvane members 38 and 40 and are mounted adjacent the rearward upper horizontal corner edge 26 and the rearward vertical corner edges 28 in similar fashion to the mounting of the corresponding forward airvane members 38 and 40.

FIG. 4 is a schematic plan view and illustrates the mounting of the rear laterally spaced vertical airvane members 60 so that curved sections or portions 60a extend rearwardly of the plane of the rear planar surface 18 of the trailer 11. The rear airvanes 60 have generally planar portions 60b which are directed toward the forward end of the trailer 11 in parallel outwardly spaced relation to the lateral planar side surfaces 16 of the trailer body 11.

As will be noted from FIG. 4, the rear mounted laterally spaced vertical airvane members 60 are fitted to the trailer body 11 so as to comprise substantially mirror images of the forward mounted vertical airvane members 40. The trailing edges of the curved portions 60a of the rear mounted airvane members 60, are spaced rearwardly from the rear planar surface 18 of the bluff body 11 by a distance represented by the letter $e$. The forwardly directed planar portions 60b of the rear vertical airvane members 60 are spaced outwardly from the corresponding lateral side surfaces 16 of the bluff body 11 by distances represented by the letter $d$. The rear mounted airvane members 60 effect optimum air drag reduction on the bluff body 11 when they are mounted such that the air flowing between the rear airvane members and the adjacent underlying outer surfaces of the bluff body is decelerated or diffused. The desired deceleration of the air flowing between the rear mounted airvane members 60 and the outer surface of the bluff body 11 is achieved when the rear airvane members are mounted to establish expansion ratios $e/d$ of approximately $5.5 \pm 0.5$ when the vehicle 10 is traveling at approximately 60 mph. This corresponds generally to an expansion ratio of approximately 3.2 when the vehicle 10 is traveling at approximately 120 mph. Because the rear mounted vertical airvane members 60 are substantially mirror images of the forward mounted vertical airvane members 40, it will be noted that the expansion ratios $e/d$ of the rear mounted vertical airvane members 60 are equal to the contraction ratios of the forward mounted vertical airvane members 40.

To insure complete air flow through the air flow passages defined between the rear mounted airvane members 60 and the adjacent outer surfaces of the bluff body 11, the planar portions 60b of the rear mounted airvane members 60 are spaced outwardly from the associated lateral side surfaces 16 of the bluff body 11 such that the distance designated by $d$ is approximately 2.5 cm. It is important that the rear airvanes 60 be mounted in close enough proximity to the lateral side surfaces 16 of the bluff body 11 to prevent the energy of the air passing through the air flow passages defined by the airvane members 60 from effecting an undesirably high net drag on the bluff body.

For optimum operating results, the rear mounted airvanes in accordance with the present invention are preferably mounted in pairs. FIG. 4 illustrates a pair of rear mounted laterally spaced vertical airvane members 50. FIG. 5 schematically illustrates mounting of top and bottom horizontally disposed airvane members 58 adjacent the rear upper horizontal corner edge 26 and a rear lower horizontal corner edge 62, respectively, of the bluff body 11. The upper and lower horizontal airvane members 58 are identical in configuration and each includes a concave curved portion 58a extending rearwardly of the plane of end surface 18, and a forwardly directed planar portion 58b disposed in outward spaced parallel relation to the associated upper or lower longitudinal surfaces 14 and 64 of the bluff body 11. The upper rear airvane member 58 is mounted so as to constitute a mirror image of the forward mounted horizontal airvane member 40, while the lower rear airvane member 58 comprises a mirror image of the upper rear airvane member 58. Thus, the upper and lower rear airvane members 58 have expansion ratios $e/d$ of approximately $5.5 \pm 0.5$, considered when the bluff vehicle 10 is traveling at approximately 60 mph. This would correspond to an expansion ratio of approximately 3.2 with the bluff vehicle traveling at a relative road speed of approximately 120 mph. The contraction and expansion ratios set forth for the forward and rear mounted airvane members at a vehicle speed of 120 mph have been established under wind tunnel testing, the typical actual road speeds of contemporary bluff vehicles being approximately 60 mph.

It has been found that when a lower rear horizontal airvane member 58 is not employed in combination with an upper rear horizontal airvane on the bluff vehicle body 11, it is desirable that a flat air deflection plate, such as indicated at 66 in FIG. 6, be mounted perpendicular to the rear surface 18 of the bluff body 11 at approximately ½ its vertical height. The rearwardly extending air deflecting plate 66 serves to increase the pressure recovery on the rear surface 18 of the bluff body 11 when a lower horizontal airvane member 58 is not employed, and thereby achieves greater air drag reduction for the bluff body 11.

By employing rear mounted horizontal and vertical airvane members 58 and 60, respectively, on the bluff body 11 as described, relative air flow adjacent the longitudinally extending surfaces of the bluff body 11 is caused to pass through the flow passages defined between the rear mounted airvanes and the adjacent outer surface areas of the bluff body. Air flowing through the air passages defined by the rear airvanes is decelerated and, in accordance with Bernoulli's principle, establishes higher pressures at the exits of the rear mounted airvanes than the pressures which would exist at the locations of the exit ends of the rear airvanes if the air flow was not modified by the rear mounted airvanes. The higher pressure at the exit ends of the rear mounted airvanes acts on the rear surface 18 of the bluff body 11 and decreases the net air drag on the bluff body. The air flowing over the exterior surfaces of the rear mounted airvanes 58 and 60 stays attached to the exterior surfaces until a separation point is reached, which generally occurs at an angle of 10°–12° from the free stream of air flow. A line drawn tangent to the exterior surface of an airvane 58 at the point of such flow separation forms an included angle with the horizontal as indicated in FIG. 5 by the Greek symbol beta.

It has been found that a greater reduction in air drag on a bluff body such as indicated at 11 can be attained with rear airvanes mounted in tandem as illustrated schematically in FIG. 7. As there shown, each of a pair of identically shaped airvanes 68 has a curved portion 68a and a planar portion 68b corresponding, respectively, to the aforedescribed curved portion 40a and planar portion 40b of a front mounted airvane member 40. The rear airvanes 68 are mounted in substantially parallel or "piggyback" fashion. The mounting of the rear airvane members 68 differs from the mounting of the aforedescribed rear airvane members 58 and 60 in that the planar portions 68b are disposed in parallel spaced relation rearwardly from the rear generally vertical surface 18 of the bluff body 11, while the curved portions 68a are directed forwardly toward the forward end of the bluff body in upwardly spaced relation from the upper longitudinal surface 14.

By employing rear mounted airvane members, such as indicated at 58 and 60, in combination with the described forward mounted airvane members 38 and 40, the air flow patterns just aft of the bluff body 11 are modified such that turbulence in the wake of the bluff body will be substantially diminished. This results in less dust and/or road spray being ingested into the recirculating flow rearwardly of the moving bluff vehicle with the advantage that less dust, dirt and road grit is deposited on the rear surface of the vehicle. Additionally, the diminished turbulence rearwardly of the vehicle results in enhanced highway safety due to a reduction in vision inhibiting road sprays otherwise created in the wake of the vehicle.

It may also be desirable to mount airvanes, such as the described airvane 38, along the rearwardly extending upper horizontal edges of the trailer 11. Such airvanes may be mounted in similar fashion to the described mounting of the airvanes 38. Such upper longitudinally mounted airvanes would further reduce buffeting of the trailer 11 due to cross winds.

While preferred embodiments of the present invention have been illustrated and described, it will be obvious to those skilled in the art that changes and modifications may be made therein which come within the scope of the inventive concept. Various features of the invention are set forth in the following claims.

What is claimed is:

1. In a bluff vehicle having a forward generally vertically disposed bluff surface against which air directly impinges when the vehicle moves in a forwardly direction, said bluff surface intersecting longitudinally rearwardly extending surfaces of the vehicle in substantially normal relation to define substantially right angle windward corner edges peripherally of the bluff surface, the air impinging said bluff surface forming an air stagnation point from which the air passes radially outwardly around said corner edges; the combination therewith comprising airvane means including an airvane member supported on said bluff vehicle adjacent at least one of said windward corner edges, said airvane member extending substantially the full length of said adjacent corner edge and having a forward curved portion extending forwardly of the plane of said bluff surface and defined by a generally uniformly curved smooth surface having a concave curvature relative to the adjacent corner edge, said curved portion of said airvane member defining an arcuate segment in transverse cross-section having an included arcuate angle of between approximately 45° and 90°, said airvane member having a generally planar rearward portion extending rearwardly beyond the plane of said bluff surface in overlying generally parallel relation to the adjacent longitudinally extending surface of the vehicle, said airvane member defining with said bluff surface and the adjacent longitudinally extending surface of said vehicle an air flow passage, said rearward portion of said airvane member extending rearwardly of the plane of said bluff surface a distance sufficient to effect smooth laminar mixing of air passing rearwardly from said air passage with air flowing over the external surface of said airvane member, said air flow passage having a contraction ratio, $b/c$, sufficient to effect acceleration of air flowing through said air flow passage when said vehicle is moved in a forwardly direction so as to substantially reduce air separation from said adjacent longitudinally extending surface as the air passes rearwardly from said airvane member, and substantially decrease air drag acting on the vehicle, where:

$b$ = the distance between the leading edge of said curved portion of said airvane member and said bluff surface, measured perpendicular to said bluff surface, and $c$ = the distance between the planar rearward portion of the airvane member and said adjacent longitudinally extending surface of said bluff vehicle, measured perpendicular to said longitudinally extending surface.

2. The combination as defined in claim 1 wherein said windward corner edges include laterally spaced, generally vertical, substantially right angle side corner edges and an upper generally horizontal substantially right angle corner edge, and wherein an airvane member is supported on said vehicle in generally vertical relation adjacent each of said vertical side corner edges thereof, each of said vertically disposed airvane members having a forward curved portion extending forwardly of the plane of said bluff surface and defined by a uniformly curved smooth surface having a concave curvature relative to its said adjacent corner edge, said curved portion of said side airvane member defining an arcuate segment in transverse cross section having an included angle of between approximately 45° and 90°, each of said side airvane members having a rearward generally planar portion spaced outwardly from and generally parallel to the adjacent longitudinal side surface of the vehicle so as to define an air flow passage through which air is caused to flow when said vehicle is moved in a forwardly direction, each of said air flow passages having a contraction ratio, $b/c$, as defined in claim 19 so as to effect acceleration of air flowing through said air flow passages to substantially reduce air separation from the adjacent longitudinal side surfaces as the air passes rearwardly from said air flow passages.

3. The improvement as defined in claim 1 wherein the bluff vehicle includes a vehicle body having a vertical height in the range of approximately 8 feet to 13 feet, and wherein said planar rearward portion of said airvane member is disposed parallel to and spaced from said adjacent longitudinally extending surface of said vehicle a distance of approximately 2–3 cm.

4. The combination as defined in claim 1 wherein said air stagnation point is located at approximately the center of the bluff surface impinged by air during movement of the vehicle in a direction to effect rearward air flow over said vehicle, and wherein said forward curved portion of said airvane member has a radius of curvature of less than 12% of the distance from the midpoint of said one of said corner edges to said stagnation point.

5. The combination as defined in claim 4 wherein said rearward generally planar portion of said airvane member has a length, considered in the longitudinal direction of the bluff vehicle, of between approximately ½ and 3/2 times the radius of curvature of said forward curved portion of said airvane member.

6. The combination as defined in claim 1 wherein said airvane member is spaced from said bluff vehicle to provide an airvane contraction ratio, $b/c$, in the range of approximately 2 to 6 when the relative air speed of said vehicle is in the range of approximately 60 to 120 mph, where $b$ and $c$ are defined as in claim 19.

7. The combination as defined in claim 6 wherein said airvane member is supported adjacent an upper horizontal corner edge of said bluff surface, and including an additional airvane member supported in vertical relation on said bluff vehicle adjacent each of the generally vertical side corner edges of said bluff surface, said side airvane members being of substantially similar transverse configuration to said upper horizontal airvane member and each being spaced from said bluff surface and the adjacent longitudinally extending side surface of said vehicle to establish an airvane contraction ratio, $b/c$, in the range as defined in claim 6 wherein b and c are defined as in claim 19.

8. An airvane assembly for use in reducing the air drag on a bluff vehicle or the like having a windward bluff surface, longitudinal top and side surfaces, and substantially right angle windward corner edges; said airvane assembly comprising an airvane having a curved portion defined by an arcuate segment in transverse cross section having an included angle of between approximately 45° and 90°, said airvane having a generally planar portion formed integral with said curved portion, said airvane assembly further including means for mounting the airvane on the bluff vehicle such that said curved portion extends forwardly of said windward bluff surface and is concave relative to one of said right angle windward corner edges and with said planar portion extending in the rearward direction of said vehicle rearwardly of the plane of said bluff surface in generally parallel spaced relation from the adjacent longitudinal surface of said vehicle such that said airvane defines an air flow passage between the airvane and the adjacent external surface of the bluff vehicle through which air is caused to flow after impinging said bluff surface as the vehicle is moved to effect air flow over the vehicle, said mounting means being adapted to mount said airvane so as to define an air passage contraction ratio, $b/c$, in the range of approximately 2 to 6 when the relative air speed of the vehicle is in the range of approximately 60 to 120 mph whereby said air flow passage causes said air flow therethrough to remain in close proximity to said adjacent external surface of said vehicle without separating therefrom after passing through said air flow passage, where:

$b =$ the distance between the leading edge of said curved portion of said airvane member and said bluff surface, measured perpendicular to said bluff surface, and $c =$ the distance between the planar rearward portion of the airvane member and said adjacent longitudinally rearwardly extending surface of said bluff vehicle, measured perpendicular to said longitudinally extending surface.

9. An airvane as defined in claim 8 wherein said generally planar portion of said airvane has a length, considered in the longitudinal direction of the bluff vehicle, of between approximately ½ and 3/2 times the radius of curvature of said forward curved portion of said airvane.

* * * * *

UNITED STATES PATENT AND TRADEMARK OFFICE
CERTIFICATE OF CORRECTION

PATENT NO. : 3,999,797
DATED : December 28, 1976
INVENTOR(S) : Jeffrey W. Kirsch and Sabodh K. Garg It is certified that error appears in the above–identified patent and that said Letters Patent are hereby corrected as shown below:

Column 1, line 13        "Commerical" should be --Commercial--.

Column 10, line 57
(Claim 2)        "Claim 19" should be --Claim 1--.

Column 11, line 22
(Claim 6)        "Claim 19" should be --Claim 1--.

Column 11, line 35
(Claim 7)        "Claim 19" should be --Claim 1--.

Signed and Sealed this

Third Day of May 1977

[SEAL]

Attest:

RUTH C. MASON
*Attesting Officer*

C. MARSHALL DANN
*Commissioner of Patents and Trademarks*